United States Patent Office 2,975,918
Patented Mar. 21, 1961

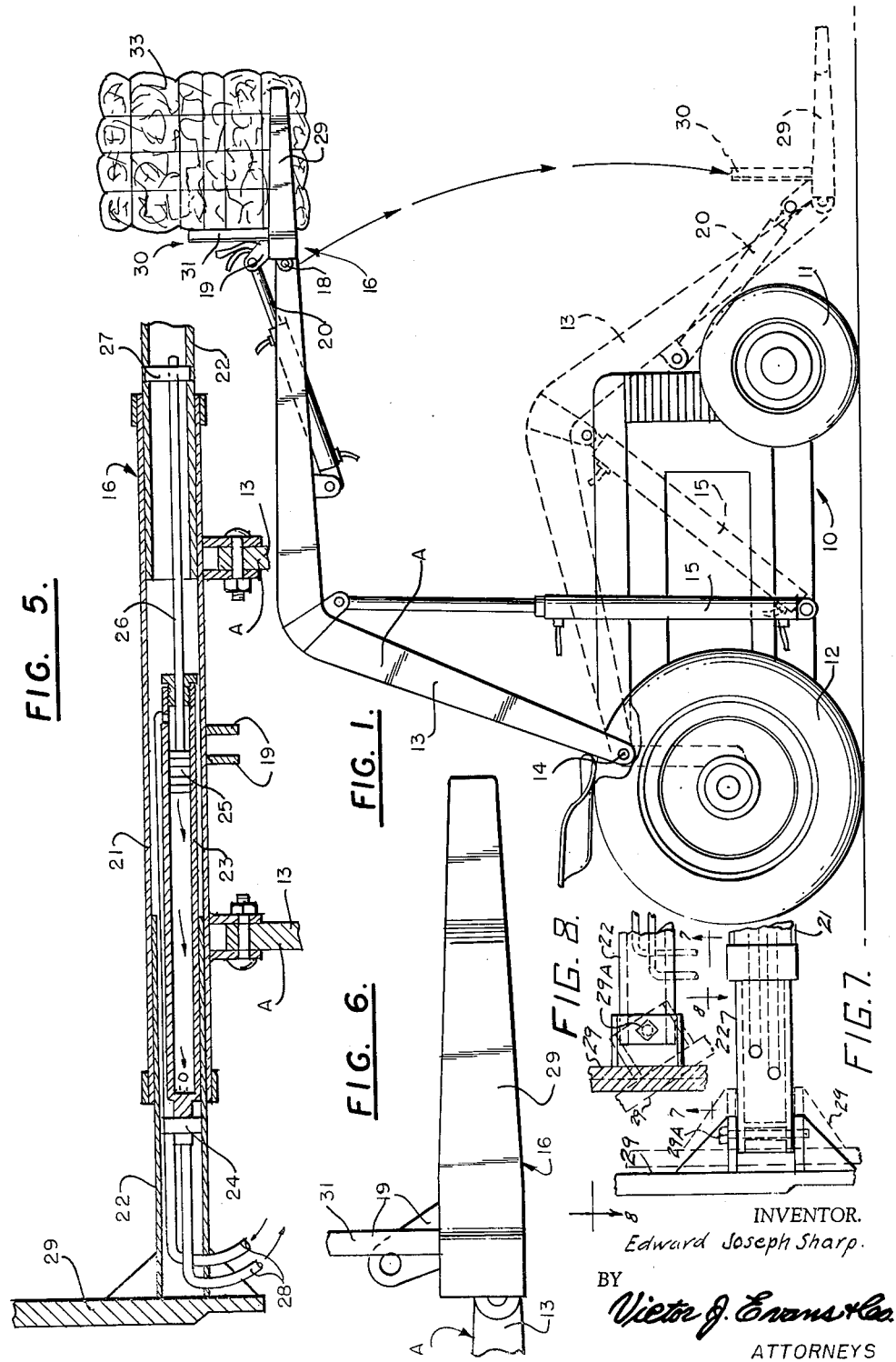

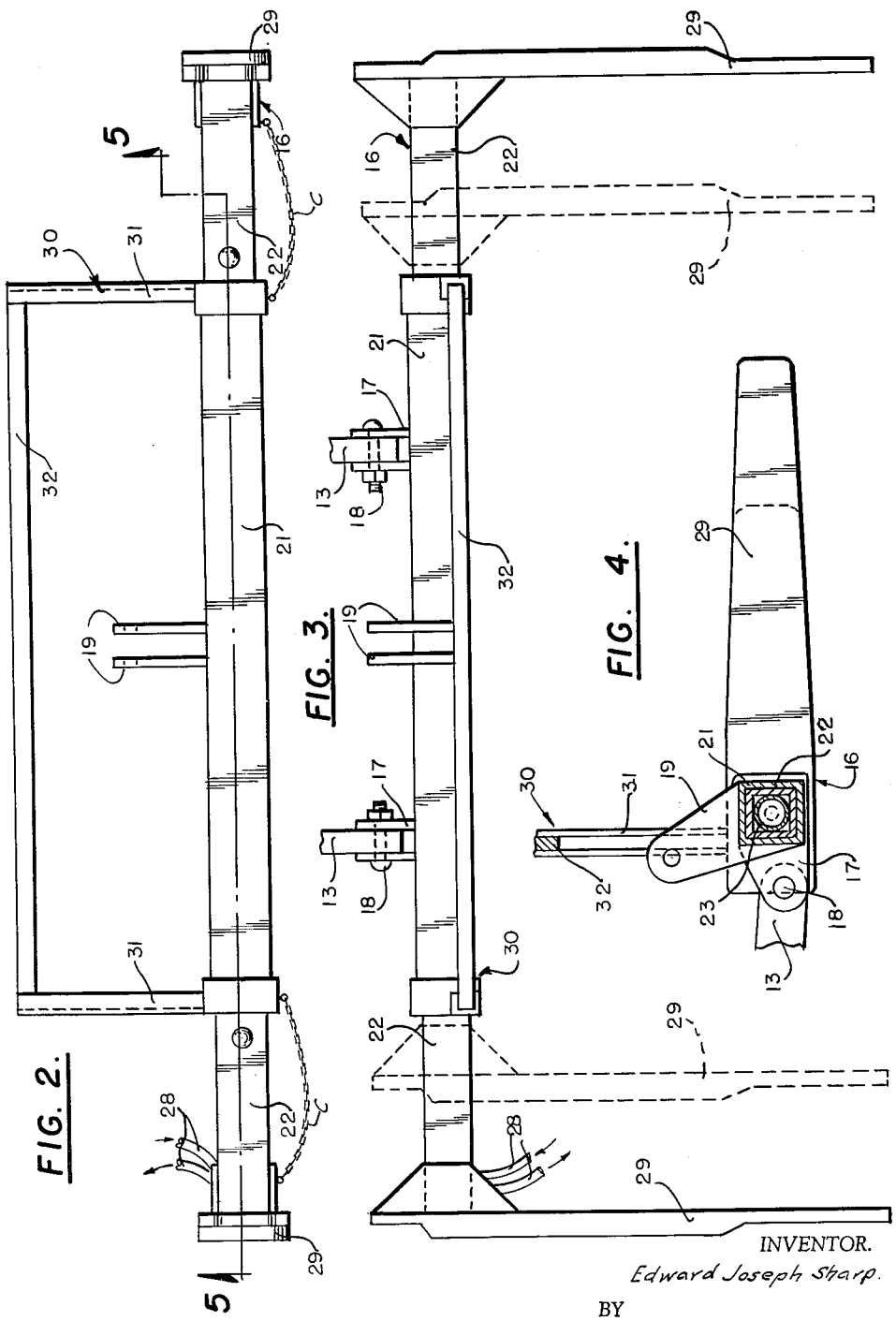

2,975,918
LOADING ATTACHMENT
Edward Joseph Sharp, 1421 Oregon Ave.,
The Dalles, Oreg.
Filed Feb. 20, 1959, Ser. No. 794,558
3 Claims. (Cl. 214—147)

This invention relates to a material handling machine or apparatus, and more particularly to a loading attachment for a vehicle such as a tractor.

The object of the invention is to provide a loading device which consists of a material gripping mechanism that is adapted to be operatably connected to booms on a tractor whereby the material gripping mechanism can be actuated in order to conveniently lift up a plurality of articles such as bales of hay.

Another object of the invention is to provide a loading attachment which includes a pair of blades that are mounted for movement towards and away from each other, and wherein a hydraulic cylinder is provided for actuating the blades, so that a plurality of articles such as bales of hay can be simultaneously lifted or lowered or otherwise conveniently handled.

A still further object of the invention is to provide a hay squeeze which is constructed so that a plurality of bales of hay can be picked up in a pile whereby such a load can be easily handled and stacked without excessive gaps, and wherein the bales can be stacked squarely alongside a building wall or on a trailer, and wherein the bales of hay can be stacked or handled without requiring a person to touch the bales by hand, and wherein there will be no discomfort to the operator.

A further object of the invention is to provide a compact material handling device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the load handling apparatus of the present invention mounted on a tractor, and with the parts in raised position handling a plurality of bales of hay;

Figure 2 is a front elevational view showing the attachment per se;

Figure 3 is a top plan view of the assembly of Figure 2;

Figure 4 is a transverse sectional view taken through the attachment;

Figure 5 is a longitudinal sectional view taken through the attachment and taken on the line 5—5 of Figure 2;

Figure 6 is a side elevational view of the device;

Figure 7 is a fragmentary sectional view illustrating a modification; and

Figure 8 is a sectional view taken on the line 8—8 of Figure 7.

Referring in detail to the drawings, the numeral 10 indicates a conventional tractor which includes the usual front wheels 11 and rear wheels 12. There is further provided a pair of spaced parallel similar booms 13 which are pivotally connected to the tractor 10 as at 14, and hydraulic cylinders 15 are provided for raising and lowering or pivoting the booms 13 on the pivot pins 14.

According to the present invention there is provided a material gripping mechanism which is indicated generally by the numeral 16, and the mechanism 16 is operatably connected to the front ends of the pair of booms 13. The mechanism 16 includes a hollow support member 21 which is rectangular in cross section, and extending rearwardly from the support member 21 and secured thereto or formed integral therewith are pairs of spaced apart ears 17. The front ends of the booms 13 are pivotally connected to the ears 17 as at 18. Also extending rearwardly from the support member 21 and secured thereto is a pair of spaced parallel lugs 19, and the lugs 19 are connected to a hydraulic cylinder 20 so that when the cylinder 20 is actuated, the entire mechanism 16 can be tilted or pivoted as desired. It is to be understood that suitable controls as well as pumps, reservoir tanks and the like are adapted to be arranged on the tractor 10 in the usual manner for properly controlling actuation of the various hydraulic cylinders.

Slidably connected to the support member 21 is a pair of alined hollow arms 22 which project outwardly from opposite ends of the support member 21, and the arms 22 are also rectangular in cross section, as for example as shown in Figure 4. The numeral 23 indicates a hydraulic cylinder which is arranged within the support member 21, and one end of the cylinder 23 is anchored to one of the arms 22 as at 24. Movably or slidably arranged in the cylinder 23 is a piston or plunger 25, and a piston rod 26 has its inner end connected to the piston 25, while the outer end of the rod 26 is anchored to the adjacent arm 22 by means of a pin 27. The cylinder 23 is of the double acting type, and conduits or lines 28 are connected to opposite ends of the cylinder 23 whereby hydraulic fluid can be supplied from a suitable location on the machine 10 so as to selectively cause movement of the piston 25 whereby the arms 22 can be moved in or out with respect to the support member 21.

Secured to the outer end of each arm 22 is a blade 29, and the pair of blades 29 are mounted for movement towards and away from each other. Each of the blades 29 has a tapered formation so that the front portion thereof is of less height than the rear portion thereof, as for example as shown in Figure 6, and this arrangement facilitates the insertion of the front end into difficult to reach places which are usually difficult to gain access to.

There is further provided a backrest which is indicated generally by the numeral 30, and the backrest 30 helps prevent the articles being handled such as the bales of hay 33 from accidentally falling backward off of the mechanism 16. The backrest 30 includes a pair of spaced parallel upright bars 31 which have their lower ends secured as by welding to the ends of the support member 21, and a crosspiece 32 extends between the ends of the bars 31 and is secured thereto.

From the foregoing, it is apparent that there has been provided a device which is especially suitable for handling a plurality of articles such as a plurality of bales of hay as for example the bales of hay indicated by the numeral 33 in Figure 1. According to the present invention, with the booms 13 attached to the tractor 10 as shown in the drawings, the mechanism 16 is operatably connected to the front ends of the booms 13 and by supplying hydraulic fluid under pressure to one end of the cylinder 23 through one of the lines 28, the piston 25 can be moved in the cylinder 23 and since the rod 26 is anchored to one arm 22 as at 27, while the cylinder 23 is anchored to the other arm 22 as at 24, it will be seen that by introducing hydraulic fluid into the cylinder 23, the arms 22 can be moved in or out of the support member 21. The blades 29 are fixedly secured to the outer ends of the arms 22 so that as the arms 22 move in or out of the member 21, the blades 29 will be moved towards or away from each other whereby a plurality of articles such as the bales of hay 33 can be clamped and then lifted or loaded or lowered as desired. The support member 21 has the backrest 30 secured thereto so that the bales 33 will not accidentally topple rearwardly therefrom. By actuating the cylinder 20, the mechanism 16 can be pivoted about an axis extending through the pins 18 and by actuating the cylinder 15, the booms 13 can be raised or lowered, as for example as shown by solid and dotted lines in Figure 1.

Since the cylinder 23 is of the double acting type, it will be seen that the blades 29 can be moved apart as for example they can be moved from the dotted line position of Figure 3 to the solid line position of Figure 3 when the articles 33 are to be released. Similarly, the blades 29 can be moved together when the articles such as the articles 33 are to be gripped firmly therebetween.

The parts can be made of any suitable material and in different shapes or sizes.

Thus, it will be seen that there has been provided a simple compact hay handling attachment for a loader, and the arms 22 are made to fit for sliding motion inside the main frame or member 21. The hydraulic cylinder 23 inside the member 21 provides the power for the squeeze action. The hay squeeze of the present invention can pick up as many as nine bales in a pile so that such a load can be handled easily and conveniently and for example five bales on edge and four bales flat can be used to make a square pile so as to enable the operator to make an excellent stack or load without excessive gaps. Nine bales also make a pile as wide as the tractor which makes it possible to stack squarely alongside a building wall.

The attachment is clean and simple and cannot be damaged and requires no service and one person can load, unload and stack a large quantity of string baled hay without touching a single bale by hand, and a great quantity of bales can be loaded or unloaded without discomfort to the operator. The attachment can be easily manufactured at a reasonable cost since no machine work is required with the exception of the hydraulic cylinder.

Referring now to Figures 7 and 8 of the drawings, there is illustrated a modification wherein the blade 29 may be pivotally or hingedly connected to the arm 22, as for example by means of a pivot pin 29A. By having the blades 29 pivotally connected to the arms 22, as shown in Figures 7 and 8, the blades 29 can be moved to a position as for example as shown in dotted lines in Figure 7 so that they will lie flat on the ground in order to facilitate picking up loads. Thus, the blades 29 can either be used in solid line position of Figures 7 and 8, or else they can be used in the dotted line position.

The attachment of the present invention can be used for handling various types of material such as lumber, posts, tanks, poles, troughs, gates and the like, and in certain instances the handling of such articles is made easier by rotating the blades to a flat position. The attachment is especially suitable for use on ranches or the like, and the long blades are ideal to move big harrows as well as hay feeders.

In Figures 7 and 8, the blades are hinged to the arms so that they can be quickly converted to a flat position to facilitate handling lumber, posts, water troughs and the like that are constantly moved about a farm.

The attachment of the present invention is adapted to be used with a conventional loader such as a Davis loader and it can be used on the loader in place of the bucket or other attachment. As shown in a figure such as Figure 2, a stop chain C can be used between the outer end of the arm and the main center section which prevents one arm from moving clear out of the main section in case the other arm sticks a little.

Minor changes in shape, size and rearrangement of details coming within the field of invention claimed may be resorted to in actual practice, if desired.

I claim:

1. In a material handling machine, a tractor, a pair of booms pivotally connected to said tractor, hydraulic cylinders for moving said booms, a material gripping mechanism connected to said booms, said material gripping mechanism comprising a hollow rectangular shaped support member having pairs of rearwardly disposed ears pivotally connected to said booms, a pair of spaced parallel lugs extending rearwardly from said support member, a hydraulic cylinder connected to said booms and to said lugs, first and second alined rectangular shaped arms slidably mounted in said support member and projecting outwardly therefrom, a hydraulic cylinder positioned within said support member, one end of said last named cylinder being anchored to said first arm, a piston movably mounted in said last named cylinder, a movable rod connected to said piston, the outer end of said rod being anchored to said second arm, a pair of spaced parallel tapered blades secured to the outer ends of said arms, said blades being mounted for movement towards and away from each other, and a backrest connected to said support member.

2. In a material handling machine, a tractor, a pair of booms pivotally connected to said tractor, hydraulic cylinders for moving said booms, a material gripping mechanism connected to said booms, said material gripping mechanism comprising a hollow support member having pairs of rearwardly disposed ears pivotally connected to said booms, a pair of spaced parallel lugs extending rearwardly from said support member, a hydraulic cylinder connected to said booms and to said lugs, first and second alined arms slidably mounted in said support member and projecting outwardly therefrom, a hydraulic cylinder positioned within said support member, one end of said last named cylinder being anchored to said first arm, a piston movably mounted in said last named cylinder, a movable rod connected to said piston, the outer end of said rod being anchored to said second arm, a pair of spaced parallel blades secured to the outer ends of said arms, said blades being mounted for movement towards and away from each other, said blades each having a tapered formation, said arms and support member being rectangular in cross section, a backrest connected to said support member, said backrest including a pair of spaced parallel bars extending upwardly from the ends of said support member and secured thereto, and a cross-piece extending between the upper ends of said bars and secured thereto.

3. In a material handling apparatus, a hollow support member, first and second alined arms slidably mounted within said support member, connected to said support member and projecting outwardly therefrom at opposite ends thereof, a hydraulic cylinder positioned within said support member and within said first arm, one end of the cylinder being anchored to said first arm, a piston movably mounted in said cylinder, a movable rod connected to said piston, the other end of said rod being anchored to and extending into said second arm, a pair of spaced parallel blades secured to the outer ends of said arms, said blades being mounted for movement towards and away from each other, said blades having a tapered formation, and a backrest connected to said support member.

References Cited in the file of this patent

UNITED STATES PATENTS

| | | |
|---|---|---|
| 2,706,570 | Jewell | Apr. 19, 1955 |
| 2,781,928 | McNeice | Feb. 19, 1957 |
| 2,887,236 | Mindrum | May 19, 1959 |
| 2,896,994 | Fischer | July 28, 1959 |